US010270337B2

United States Patent
Langlinais et al.

(10) Patent No.: US 10,270,337 B2
(45) Date of Patent: Apr. 23, 2019

(54) DYNAMIC INTEGRATION BASED CURRENT LIMITING FOR POWER CONVERTERS

(71) Applicant: Apple Inc., Cupertino, CA (US)

(72) Inventors: Jamie L. Langlinais, San Francisco, CA (US); Mark A. Yoshimoto, San Jose, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 15/145,642

(22) Filed: May 3, 2016

(65) Prior Publication Data

US 2016/0352225 A1 Dec. 1, 2016

Related U.S. Application Data

(60) Provisional application No. 62/166,112, filed on May 25, 2015.

(51) Int. Cl.
*H02M 3/157* (2006.01)
*H02M 1/08* (2006.01)

(52) U.S. Cl.
CPC ............. *H02M 3/157* (2013.01); *H02M 1/08* (2013.01)

(58) Field of Classification Search
CPC .................................. H02M 1/08; H02M 3/157
See application file for complete search history.

(56) References Cited

U.S. PATENT DOCUMENTS

| | | | | |
|---|---|---|---|---|
| 5,859,938 A | * | 1/1999 | Nabeyama | H01S 3/1301 372/6 |
| 7,656,141 B1 | * | 2/2010 | Granat | H02M 3/158 323/284 |
| 9,178,364 B1 | * | 11/2015 | Khlat | H02J 7/0013 |
| 2003/0113599 A1 | * | 6/2003 | Pearson | H01M 8/04007 429/428 |
| 2006/0043942 A1 | * | 3/2006 | Cohen | H02M 3/156 323/207 |
| 2007/0139025 A1 | * | 6/2007 | Vinn | H02M 3/156 323/273 |
| 2008/0024095 A1 | * | 1/2008 | Lampinen | H02M 3/33507 323/247 |
| 2009/0295349 A1 | * | 12/2009 | Tao | H02M 3/33507 323/282 |

(Continued)

OTHER PUBLICATIONS

Sueker, "Transient Thermal Impedance Modeling of Semiconductor Heat Sinking", IEEE, Oct. 1993.

*Primary Examiner* — Adolf D Berhane
*Assistant Examiner* — Bart Iliya
(74) *Attorney, Agent, or Firm* — Blank Rome LLP

(57) ABSTRACT

This application relates to a power converter for a computing device. The power converter can maintain an average output current while also allowing the output current to reach a peak current limit for periods of time. The average output current is maintained by enforcing a dynamic current limit on the output current. The dynamic current limit can change over time depending on whether the average output current is above or below an average current threshold. The changes to the dynamic current limit can occur at a rate defined by one or more time constants in order to reduce electromigration and maintain a temperature of the power converter below a predetermined temperature threshold.

18 Claims, 9 Drawing Sheets

(56) References Cited

U.S. PATENT DOCUMENTS

| | | | | |
|---|---|---|---|---|
| 2009/0315411 A1* | 12/2009 | Depew | .................... | H03K 17/28 |
| | | | | 307/141 |
| 2014/0009977 A1* | 1/2014 | Huang | ............... | H02M 3/33507 |
| | | | | 363/21.16 |
| 2015/0048683 A1* | 2/2015 | Letas | ...................... | H02J 3/386 |
| | | | | 307/52 |
| 2015/0357913 A1* | 12/2015 | Tschirhart | ............. | H02M 3/156 |
| | | | | 323/282 |
| 2016/0315536 A1* | 10/2016 | Harriman | ........... | G01R 19/0092 |
| 2017/0259846 A1* | 9/2017 | Koseki | ................ | H02P 29/0243 |

\* cited by examiner

DYNAMIC INTEGRATION BASED CURRENT LIMITING FOR POWER CONVERTERS

CROSS-REFERENCE TO RELATED APPLICATIONS

The present application claims the benefit of U.S. Provisional Patent Application 62/166,112, filed May 25, 2015, the contents of which are incorporated herein by reference in their entirety for all purposes.

FIELD

The described embodiments relate generally to power converters. More particularly, the present embodiments relate to power converters that can dynamically adjust an output current of the power converter to maintain an average current output for the power converter.

BACKGROUND

Power distribution within consumer electronics has become increasingly difficult to manage since the inception of electronic devices into consumer markets. For example, many mobile computing devices have been developed to take on responsibilities that require designers to incorporate more power consuming hardware into the devices. Although, a solution to the lack of available power within a device at any given time can be to include a larger power supply within the device, constraints due to physical size, thermal operating envelope, and battery capacity of a device can limit the size of certain device power supplies. As a result, many devices can occasionally experience frequent faults that can shorten the lifespan of a device or result in unpredictable behavior that could cause loss of data or other undesirable consequences.

SUMMARY

This paper describes various embodiments that relate to a power converter configured to allow for higher peak power delivery while enforcing an average current output and/or a direct current (DC) limit. In some embodiments, the power converter can include a logic component. The logic component can be configured to dynamically adjust a threshold current level according to whether an integrated current output signal is changing, in order to maintain a predetermined average current output of the power converter. Additionally, the logic component can be configured to throttle an output of the power converter when the output exceeds the threshold current level, wherein the output relates to a current provided by the power converter.

In other embodiments, a method is set forth for dynamically adjusting a current limit for a power converter to maintain an average current output for the power converter. The power converter can perform steps that include dynamically adjusting the current limit of the power converter according to whether previous output current values for the power converter correlate to the average current output that is above or below a predetermined average current threshold. Additionally, the steps can include throttling an output of the power converter when the output exceeds the current limit, wherein the output relates to a current provided by the power converter.

In yet other embodiments, a computing device is set forth. The computing device can include a power source and a power converter. The power converter can include one or more switches that are configured to toggle between switch states. A period between each switch state can be dynamically adjusted according to a rate of change of a summation of current signals. Additionally, the rate of change of the summation of current signals can be at least partially based on one or more predetermined time constants.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
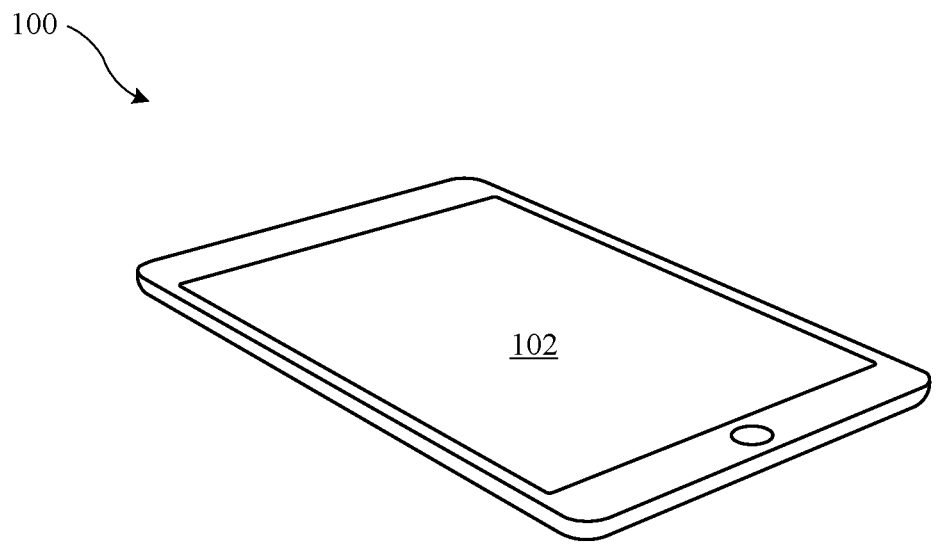
FIG. 1A illustrates a perspective view of a computing device that can incorporate logic for maintaining an average current limit on a component of the computing device.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate to power supplies that allow for a higher peak current limit while enforcing an average current and/or direct current (DC) limit. By allowing for a higher peak current, a device receiving power from a power supply can operate as a higher load without concern for exceeding a peak current limit. Furthermore, by enforcing the average current limit, degradation of the power supply can be mitigated over time. Certain devices, such as power supplies and power converters, can degrade as a result of temperature changes and electromigration. When electromigration and temperature are not controlled well within a device, certain components and connections between components can be compromised, rendering them inoperable. Electromigration of metal particles within a device can be most detrimental when fluctuations in current density are not adequately controlled. However, both thermal damage and electromigration can be mitigated by enforcing certain current limits within a device.

A peak current limit can be set within a device in order to prevent any currents transmitted within a device from exceeding the peak current limit. Additionally, an average current limit can be set within the device to ensure that any currents transmitted within the device stay at or near the average current limit, thereby controlling the current density within the device. In order to enforce the average current limit, one or more timers can be incorporated into the logic of the device. For example, when a peak current limit of a component of the device is reached by an output current of the component, the component can continue providing the output current at the peak current limit for a predetermined time limit. Once the predetermined time limit has expired, the output current can be reduced below the average current limit for another predetermined time limit. Each time limit can be set such that the total output current above the average current limit and below the average current limit over time averages to approximately the average current limit. Although this timer based approach can adequately enforce the average current limit, there are disadvantages to only allowing the output current to stay above the average current limit for only a predetermined amount of time. For example, performance of the device can be limited when the device treats all currents that exceed the average current limit the same. In order to optimize the performance of the device while also enforcing an average current limit, an integral based logic can be used.

An integral based logic for limiting the current of a device to an average current limit can be accomplished using a feedback loop for tracking the current over time. The current can be integrated or otherwise sequentially summed and used to adjust a dynamic current limit during operation of the device. For example, when an average output current of the device exceeds the average current limit, the dynamic current limit can be reduced as the integral of the output current increases. In this way, the output current is able to exceed the average current limit up to a peak current limit without a finite period being used for limiting how long the output current can remain above the average current limit. Once the average output current has been reduced to the average current limit or the integral of the output current has been reduced to a predetermined threshold, the dynamic current limit can thereafter be raised. By raising the dynamic current limit, the output current is able to increase as needed by a device receiving the output current without being restricted by how long the output current should remain at the average current limit. In some embodiments, the rate at which the dynamic current limit decreases can be set by one or more time constants, and the rate at which the dynamic current limit increases can be set by one or more of the same or different time constants.

The integral based logic for limiting the current of a device can be programmed or hardwired into a power converter of the device in order to limit an output current of the power converter. For example, the power converter can be a direct current (DC) to DC converter that includes one or more operational amplifiers, switches, inductors, and/or capacitors for effectively enforcing an average current limit on the power converter. The arrangement of these circuit components can depend on whether the one or more time constants are being enforced when reducing and/or raising the dynamic current limit. In some embodiments of the power converter where at least one time constant is used, one or more resistors and/or capacitors of an integrator circuit can define the time constant by which the dynamic current limit is reduced. The integrator circuit can be designed to integrate a difference between a sensed or filtered output current of the power converter and a current threshold for the power converter. An output of the integrator circuit can be connected to a multiplexer, which can also receive inputs corresponding to an instantaneous current limit and a voltage error limit. The multiplexer can output one of the inputs according to a configuration of the multiplexer. For example, the multiplexer can be configured to output the lowest of the three inputs. The output of the multiplexer can thereafter be provided to a comparator for comparing a signal representing the output current to the output of the multiplexer (e.g., the output of the multiplexer corresponding to either the instantaneous current limit, the voltage error limit, or the integrator circuit output). In some embodiments, when the output current is less than the multiplexer output, the output of the power converter will be unaffected by the comparator. However, when then the output current is greater than the multiplexer output, the output current of the power converter will be limited according to the multiplexer output. For example, the power converter can operate according to a clock signal that can control switching cycles of the power converter, and as a result, the multiplexer output can dynamically affect a period of some switching cycles of the power converter more or less than other switching cycles. Changes in the multiplexer output can be at least partially based on the time constant associated with the integrator circuit.

The integrator circuit can determine a rate at which the dynamic current limit of the output current of the power converter increases and decreases. For example, a single time constant (i.e., single pole) can provide a basis for the rate at which the dynamic current limit for the output current decreases or increases. Furthermore, the single time constant can be programmed or hardwired into the power converter. The single time constant can be based on the value of one or more resistors, capacitors, and/or inductors connected to the integrator circuit such that the dynamic current limit will scale according to the rate of increase or decrease of the output of the integrator circuit. In some embodiments of the power converter, multiple time constants (i.e., multiple poles) can be programmed or hardwired into the power converter. In this way, rates at which the dynamic current limit of the output current of the power converter increase and decrease can be the same or different.

In the multiple time constant embodiments of the power converter, a comparator and switch can be connected to the integrator circuit for selecting a time constant to increase or decrease the dynamic current limit. Depending on a state of the power converter, the comparator can cause the switch to select between one or more resistors, capacitors, and/or inductors connected to the integrator circuit to define the time constant to be employed at a given time. For example, when the output current of the power converter is decreasing towards the average current limit, the rate at which the output current is decreasing can be determined by a first time constant. When the output current of the power converter is increasing away from the average current limit, the rate at which the output current is increasing can be determined by a second time constant. In some embodiments, the increase and/or decrease of the output current can be based on multiple different time constants. Each time constant can be set according to any suitable number of characteristics exhibited by the power converter. For example, one or more time constants can be set to reduce an amount of electromigration occurring as a result of operating the power converter. Specifically, reducing the amount of the electromigration can be accomplished by setting one or more time constants to effectively maintain an average current or current density over the lifetime of the power converter. In some embodiments, one or more time constants can be set to maintain a thermal output of the power converter or other component at or below a suitable thermal limit. For example, the rate at which the output current decreases can be faster than a rate at which the output current increases. In this way, because increases in current correlate to increases in temperature, the time constant that governs the increase in output current for the power converter can be set to gradually increase the output current so as to not cause a harmful temperature increase. In some embodiments, one or more of the time constants can be variable or dynamic. For example, when a measured temperature is below a predetermined temperature threshold, the time constant that governs the increase in output current can allow the output current to increase faster than when the measured temperature is above the predetermined threshold. Similarly, when the output current is determined to be below the average current limit, the time constant(s) that governs the increase and decrease in output current can allow the output current to increase and/or decrease faster or slower compared to when the output current is above the average current limit.

These and other embodiments are discussed below with reference to FIGS. 1A-9; however, those skilled in the art will readily appreciate that the detailed description given herein with respect to these figures is for explanatory purposes only and should not be construed as limiting.

FIG. 1A illustrates a perspective view 100 of a computing device 102 that can incorporate logic for maintaining an average current limit for a component of the computing device 102, as discussed herein. By maintaining an overall current output of the component at or near an average current limit, electromigration at certain portions of the computing device 102 can be mitigated thereby increasing a time to failure for the computing device 102. The computing device 102 can be a cell phone, laptop, table computer, display, desktop computer, media player, or any other suitable electronic device in which electromigration can occur. Furthermore, it should be noted that the logic for maintaining the average current limit can also be incorporated into accessory devices such as power supplies, battery packs, wireless charging devices, or any other suitable accessory device that operates using electrical current. In some embodiments, the logic for maintaining the average current limit can be implemented as an analog or digital circuit that is hardwired or programmed into a device.

Figure 1B:
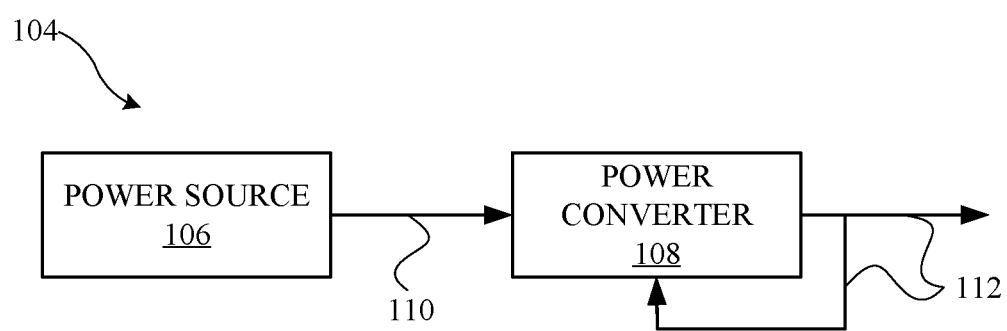
FIG. 1B illustrates a system diagram of a power converter that can regulate an amount of output current from the power converter according to an average current limit.

FIG. 1B illustrates a system diagram 104 of a power converter 108 that can regulate an amount of output current 112 from the power converter 108 according to an average current limit. The power converter 108 can be internal or external to the computing device 102 and a power source 106 that provides input current 110 to the power converter 108 can be internal or external to the computing device. For example, each of the power source 106 and the power converter 108 can be external to the computing device 102 in order to regulate an amount of current and/or voltage that can be received by the computing device 102. In some embodiments, the power converter 108 is internal to the computing device 102 and the power source 106 is external to the computing device 102. In this way, the power source 106 can be either a power adapter or a portable power source. In other embodiments, both the power source 106 and the power converter 108 are incorporated into the computing device 102.

The power converter 108 can operate using a feedback loop. The feedback loop can be a hardwired or programmed feedback loop that causes a sensed current value of the output current 112 of the power converter 108 to be fed back as an input to the power converter 108. The sensed current value is thereafter tracked over time to determine whether an average current limit for computing device 102 is being exceeded. Depending on whether the average current limit is being exceed or not, the power converter can regulate the output current 112. In this way, the power converter 108 can ensure that the average current over the lifetime of the computing device 102 is at or near the average current limit. As a result, although the power converter 108 can allow current spikes to occur from time to time in order to boost performance of the computing device 102, the average current for the power converter 108 will be kept at a level that promotes longevity for the computing device 102.

Figure 2:
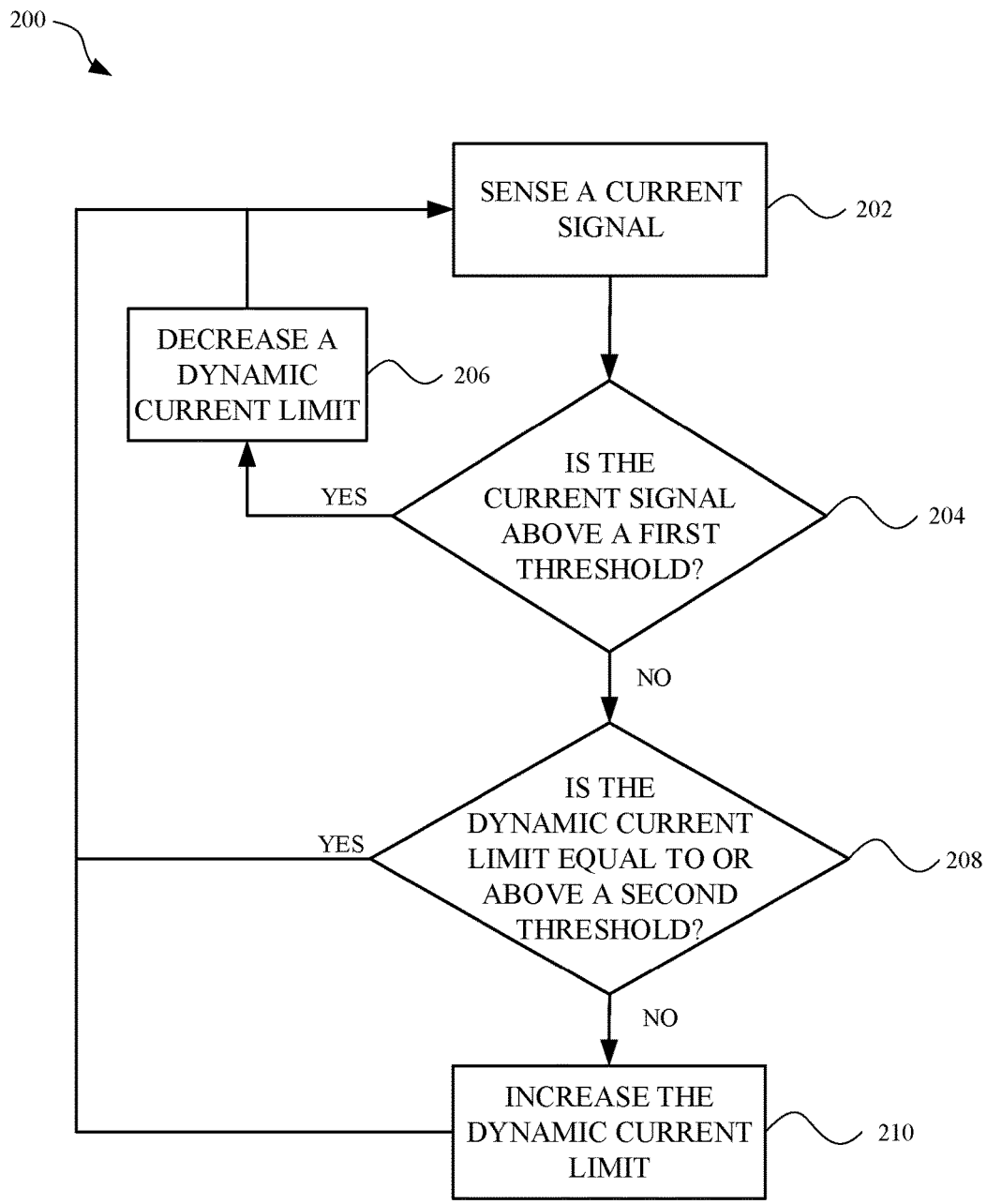
FIG. 2 illustrates a method that can be performed by the power converter in order to maintain the output current of the power converter at or near an average current limit.

FIG. 2 illustrates a method 200 that can be performed by the power converter 108 in order to maintain the output current 112 of the power converter 108 at or near an average current limit. The method 200 can be performed by a logic component of the power converter, or any other suitable logic component that is internal or external to the computing device. The logic component can be hardwired to include components that are configured to perform the method 200, or the logic component can include a processor and a memory for performing the method 200 according to instructions stored in the memory. The method 200 can include a step 202 of sensing a current signal. The current signal of step 202 can be the output current 112 that is sensed by a current sensor connected to the power converter 108. The current sensor can track the output current 112 of the power converter 108 over time in order for the power converter 108 to make appropriate decisions about how to regulate the output current 112. At step 204 of method 200, a determination is made whether the current signal is above a first threshold. The first threshold can correspond to an average current limit stored by or accessible to the power converter 108. The average current limit can be set in order mitigate any detrimental effects that can be caused by providing too much current over a conductor for a period of time. If the current signal is above the first threshold, then a dynamic current limit can be decreased in order to reduce the output current 112 of the power converter 108. The dynamic current limit can be decreased and/or increased at a rate that is set to prevent high density currents from being output by the power converter 108. For example, the rate at which the dynamic current limit increases and/or decreases can be associated with one or more time constants, as further discussed herein. As the dynamic current limit is increased at step 206, the current signal can be sensed and step 204 can be repeated, similar to a feedback loop.

At step 204, if the current signal is not above the first threshold, then at step 208, a determination is made whether the dynamic current limit is equal to or above a second threshold. The second threshold can correspond to a maximum current limit or an instantaneous current limit. The second threshold can therefore be an upper limit for the output current 112 for protecting the power converter 108. Although the power converter 108 can occasionally output a current that reaches or exceeds the second threshold, the output current 112 should not remain at the second threshold long enough to cause damage to the power converter and/or computing device 102. Therefore, the second threshold can be based on a power specification of the power converter 108, the computing device 102, the power source 106, and/or any other suitable component that can be connected to the computing device 102. If the dynamic current limit is equal to or above the second threshold at step 208, then the current signal will continue to be sensed at step 202. If the dynamic current limit is not equal to or above the second threshold, then at step 210, the dynamic current limit can be increased. The increase and decrease of the dynamic current limit at step 210 and step 206, respectively, can be performed at one or more different rates that are based on one or more different time constants, as discussed herein.

Figure 3:
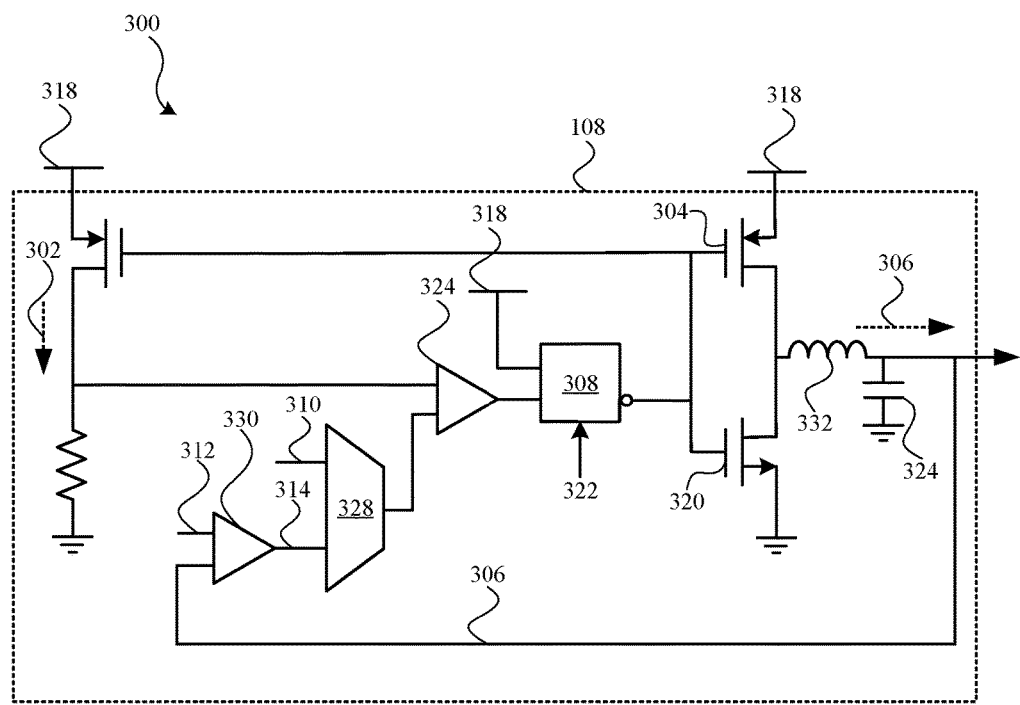
FIG. 3 illustrates a circuit diagram corresponding to different embodiments of the power converter using a timer-based approach for limiting current to an predetermined current threshold.

FIG. 3 illustrates a circuit diagram 300 of corresponding to different embodiments of the power converter 108 using a timer based approach for limiting current to an predetermined current threshold. The power converter 108 can be a buck converter or direct current (DC) to DC converter for stepping down a power supply input 318. The power converter 108 can operate in cycles according to a clock input 322 provided to a flip flop 308 of the power converter 108. During operation of the power converter 108, the power supply input 318 will be provided to the high switch 304 and low switch 320, which will periodically open and close according to the flip flop 308 output. The high switch 304 can periodically open when the low switch 320 is closed, and the high switch 304 can periodically close when the low switch 320 is open. In this way, a capacitor 332 and inductor 326 will charge and discharge periodically in manner that causes an output DC voltage, that is less than a DC component of the power supply input 318, to be provided from the power converter 108. An output current 306 corresponding to the output DC voltage can be fed back to a portion of the power converter 108 in order to determine whether to limit the output current 306 of the power converter 108 based on the output current 306.

The output current 306 can be provided to a first comparator 330 for determining whether a voltage component of the output current 306 has fallen below a reference voltage 312. The reference voltage 312 can correspond to a value for a minimum voltage threshold that the power converter 108 and/or the computing device 102 can operate at without harming the power converter 108 and/or the computing device 102. If the voltage component of the output current 306 is above the reference voltage 312, a voltage error signal 314 from the first comparator 330 will not limit the output current 306. If the voltage component of the output current 306 is below the reference voltage 312, the voltage error signal 314 of the first comparator 330 can limit the output current 306. In this way, any remaining voltage from the power supply input 318 can be preserved until voltage of the power supply input 318 increases above the minimum voltage threshold.

The voltage error signal 314 can be provided to a switch 328 of the power converter 108 for further limiting the output current 306 according to a current limit signal 310 that is also provided to the switch 328. In some embodiments, the switch 328 is a multiplexer that is configured to output a lowest input provided to the switch 328. For example, if the current limit signal 310 is less than the voltage error signal 314, then the current limit signal 310 will be output to a second comparator 324. Otherwise, if the current limit signal 310 is greater than the voltage error signal 314, the voltage error signal 314 will be provided to the second comparator 324. The second comparator 324 can cause the flip flop 308 to turn off the high switch 304 when the sensed current 302 is greater than the signal being output from the switch 328. Additionally, the second comparator 324 can cause the flip flop 308 to turn on the high switch 304 according to the clock input 322 and when the sensed current 302 is less than the signal being output from the switch 328. For each cycle or period of the clock input 322, the high switch 304 can be toggled or not toggled depending the output of the second comparator 324. In this way, if the sensed current 302 remains at a value that does not indicate (i) the voltage of the power supply input 318 has dropped below the reference voltage and (ii) the output current 306 is not larger than the current limit signal 310, the high switch 304 can toggle according to the clock input 322. Otherwise, the high switch 304 will be turned off as long as the sensed current 302 remains at a value indicating that the voltage of the power supply input 318 has dropped below the reference voltage 312. As a result of the high switch 304 being turned off during multiple cycles of the clock input 322, the output current 306 will be reduced until either the voltage component of the output current 306 is above the reference voltage 312 or the output current 306 is at or below the current limit signal 310.

Figure 4:
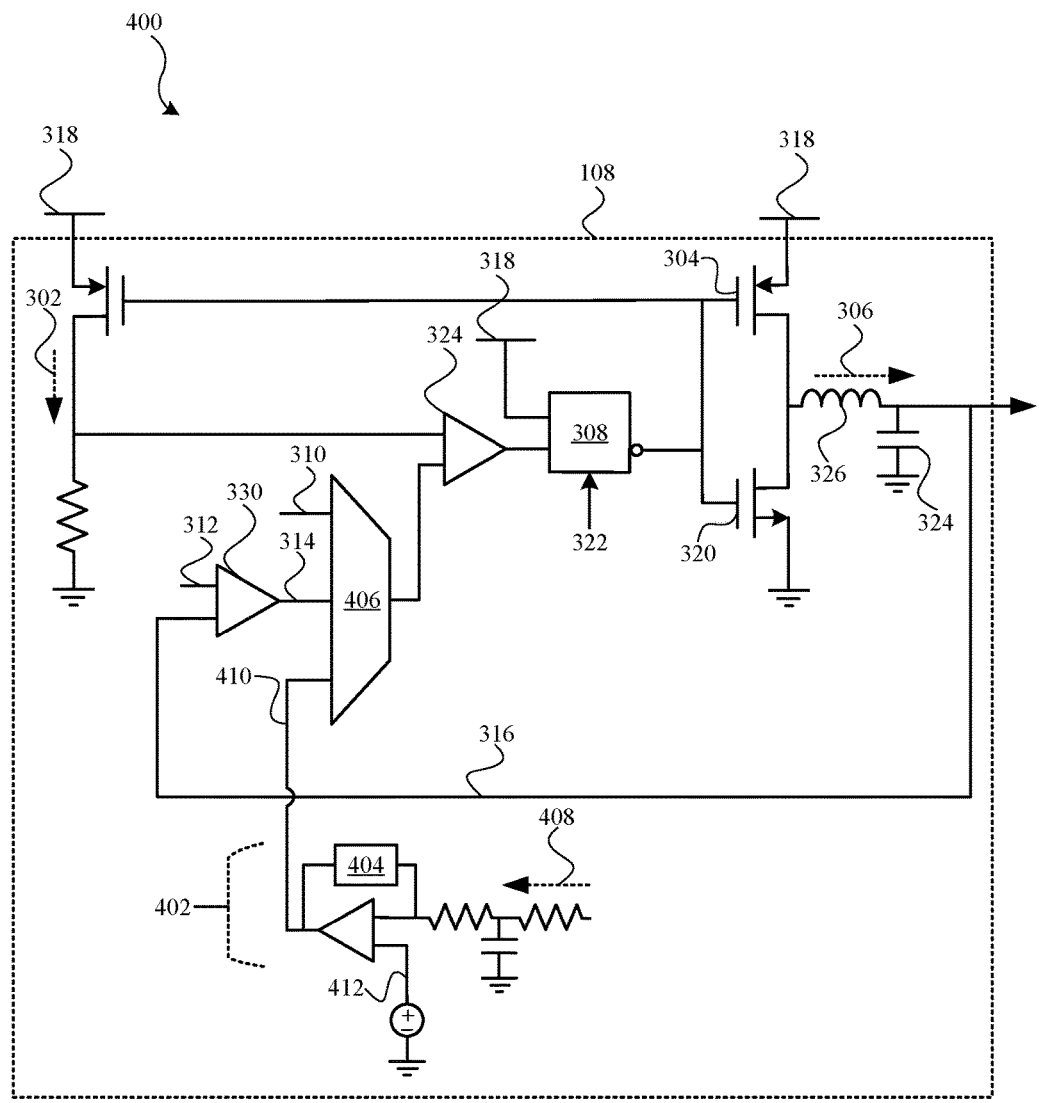
FIG. 4 illustrates a circuit diagram of embodiments of the power converter incorporating an integrator circuit for limiting the output current of the power converter.

FIG. 4 illustrates a circuit diagram 400 of embodiments of the power converter 108 incorporating an integrator circuit 402 for limiting the output current 306 of the power converter 108. The circuit diagram 400 can include many of the same elements of circuit diagram 300 of FIG. 3. However, the circuit diagram 400 can include a switch 406 for switching between at least three different inputs and outputting at least one of the inputs into the second comparator 324. At least one of the inputs to the switch 406 can be an integrator output 410, which can define a dynamic current limit for the power converter 108. The integrator circuit 402 can be configured to integrate a difference between a current limit 412 and an input current signal 408 corresponding to a sensed current output of the power converter 108. In this way, the integrator circuit 402 will affect the output current 306 of the power converter 108 only when the integrator output 410 of the integrator circuit 402 reaches a certain value, or is otherwise increasing or decreasing. For example, if the input current signal 408 is approximately equal to the current limit 412, a difference between the input current signal 408 and the current limit 412, and thus the integrator output 410, will initially be close to zero. However, as the integrator circuit 402 begins integrating the difference between the input current signal 408 and the current limit 412, the integrator output 410 will begin to gradually increase thereby causing the dynamic current limit to decrease. In some embodiments, the current limit 412 can correspond to an average current threshold or a maximum current limit at which the power converter 108 is configured to maintain the output current at or below, respectively.

A rate at which the integrator output 410 increases can be at least partially defined by one or more time constants. The one or more time constants can be established using circuit component 404, which can include one or more resistors, capacitors, and/or inductors, or any combination thereof. For example, in some embodiments the circuit component 404 can include a single capacitor, and in other embodiments the circuit component 404 can include multiple capacitors connected in series or parallel. The time constant can be a programmed value or hardwired value that corresponds to an average current level that is to be maintained at the output of the power converter 108. Additionally, the time constant can correspond to a thermal output that is to maintained at the power converter 108, or any other suitable component that the power converter 108 is connected to. In this way, a rate at which the output current 306 increases or decreases can be set so that the average current level and/or the thermal output of the power converter 108 does not exceed a predetermined threshold associated with the time constant(s).

During operation of the power converter 108, the power converter 108 can selectively throttle the output current 306 according to the integrator output 410. For example, the power converter 108 can allow the output current 306 to reach a value corresponding to the current limit signal 310, which can be an upper current limit for the power converter 108. At this point, the switch 406 can provide the current limit signal 310 as an output for comparing to the sensed current 302 at the second comparator 324. If the sensed current 302 exceeds the current limit signal 310, the second comparator 324 can output a signal to the flip flop 308 that can cause the high switch 304 to turn off for one or more cycles of the clock input 322. As a result, the output current 306 of the power converter 108 can decrease to a value that is less than a value of the current limit signal 310. However, because the integrator circuit 402 would have been integrating the input current signal 408 at least since the output current reached the current limit signal 310, the switch 406 will output the integrator output 410 to the second comparator 324. As a result, the integrator output 410 will act as the dynamic current limit for the output current 306. The integrator output 410 can be a value that scales with a summation of a difference between the current limit signal 310 and the sensed current 302. In this way, the integrator output 410 can change as the output current 306 changes. For example, as a result of the integrator output 410 decreasing, the second comparator 324 can eventually change its output to allow the high switch 304 to turn on again. In other words, once the sensed current 302 falls below the dynamic current limit (i.e., the integrator output 410) to the extent that the average output current is at a predetermined average current threshold, the second comparator 324 will provide an output to the flip flop 308. The output to the flip flop 308 can cause the high switch 304 to turn on or otherwise toggle according to the clock input 322 again.

If the output current 306 reaches a certain level indicating that the voltage of the power supply input 318 has dropped to or below a minimum voltage threshold, the high switch 304 can remain off until the voltage of the power supply input 318 rises above the minimum voltage threshold. For example, the voltage error signal 314 supplied to the switch 406 can be selected as an output by the switch 406. The voltage error signal 314 can thereafter be compared to the sensed current 302 at the second comparator 324. If the sensed current 302 is less greater than the voltage error signal 314, then the second comparator 324 can provide a signal to the flip flop 308 that causes the flip flop 308 to shut off the high switch 304. The high switch 304 can remain off until the sensed current 302 is equal to or greater than the voltage error signal 314, indicating that the power supply input 318 has a suitable amount of voltage to continue operating. In this way, the power converter 108 can (i) prevent the output current 306 from exceeding a maximum current limit (e.g., the maximum current limit set by the current limit signal 310), (ii) ensure that the power supply input 318 does not fall below a predetermined voltage level (e.g., the voltage level corresponding to the reference voltage 312), and (iii) maintain the output current 306 at a level corresponding to a predetermined average current.

Figure 5:
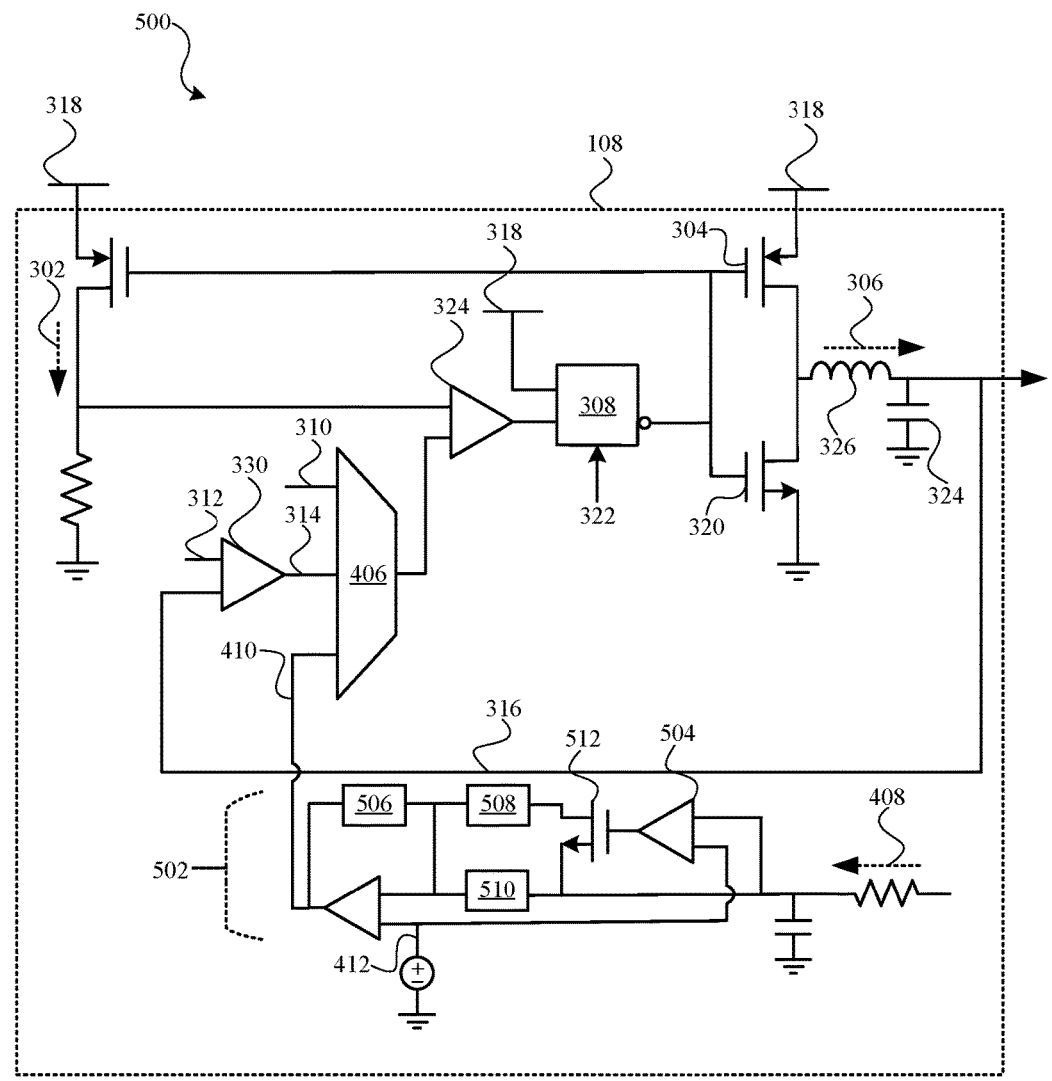
FIG. 5 illustrates a circuit diagram of embodiments of the power converter incorporating an integrator circuit for limiting a rate at which the output current of the power converter increases and decreases.

FIG. 5 illustrates a circuit diagram 500 of embodiments of the power converter 108 incorporating an integrator circuit 502 for limiting a rate at which the output current 306 of the power converter 108 increases and decreases. The integrator circuit 502 can be programmed as a digital circuit in the power converter 108 or hardwired as an analog circuit in the power converter. The integrator circuit 502 can switch between one or more time constants depending on whether the integrator output 410 is increasing or decreasing. Each time constant can be defined by one or more of the components 506, 508, and 510, which can each include a resistor, capacitor, inductor, conductor, semiconductor, or any other suitable component for defining a time constant of a signal. During operation of the integrator circuit 502, an integrator comparator 504 can cause an integrator switch 512 to be closed or open depending whether the input current signal 408 is causing the integrator output 410 to be increasing or decreasing in amplitude. In other words, when the integrator output 410 (i.e., the dynamic current limit) is increasing, one or more of the components 506, 508, and 510 can define the time constant that governs the increase of the integrator output 410. Additionally, when the integrator output 410 is decreasing, one or more of the components 506, 508, and 510 can define the time constant that governs the decrease of the integrator output 410. In this way, the output current 306 can be caused to decrease faster than increase, or be caused to increase faster than decrease.

The current limit 412 provided to the integrator circuit 502 can also provide a basis for when the output current 306 will increase or decrease. The current limit 412 can correspond to a maximum current threshold or average current limit for the output current 306 of the power converter 108. A difference between the current limit 412 and the input current signal 408 can be integrated over time in order to gage an average for the input current signal 408. The integrator comparator 504 can be configured such that when the input current signal 408 is less than the current limit 412, the integrator comparator 504 can cause the integrator switch 512 to be in a first state (e.g., opened or closed). Additionally, when the input current signal 408 is greater than the current limit 412, the integrator comparator 504 can cause the integrator switch 512 to be in a second state (e.g., opened or closed) that is different than the first state. As a result, certain components of the components 506, 508, and 510 will define a time constant for the output current 306 depending on a relationship between the input current signal 408 and current limit 412. Therefore, if the output current 306 stays above an average current threshold and causes the average current output to be above the average current threshold, the integrator circuit 502 can be configured to reduce the average current output back to the average current threshold.

Figure 6:
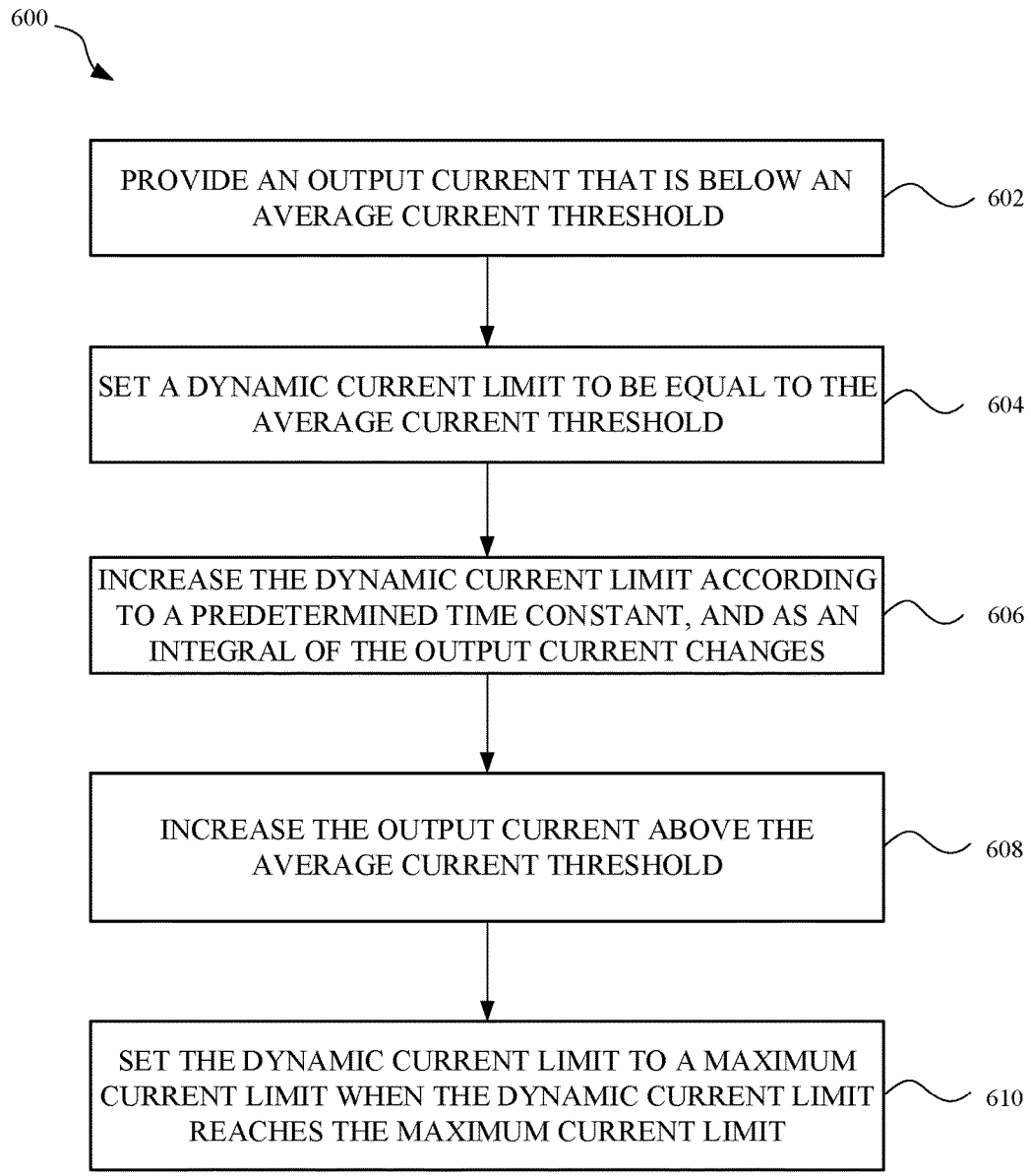
FIG. 6 illustrates a method for controlling an increase of electrical current based on an average current threshold.

FIG. 6 illustrates a method 600 for controlling an increase of electrical current based on an average current threshold. The method 600 can be performed by the power converter 108, computing device 102, a power management unit of the computing device 102, or any other suitable device, component, apparatus, processor capable of regulating current. The method 600 can include a step 602 of setting an output current below an average current threshold. The average current threshold can be based on a material composition, temperature specification, power output, and/or any other suitable metric related to the device performing method 600. At step 604, a dynamic current limit is set equal to or below the average current threshold. The dynamic current limit can be set equal to or below the average current threshold, for example, in response to an average current output being above the average current threshold for a period of time. At step 606, the dynamic current limit can be increased according to a predetermined time constant and as an integral of the output current changes. The integral of the output current can be calculated using real time and/or historical output current values. For example, in some embodiments the integral can be calculated based on a summation of a difference between a current threshold and the output current, and the dynamic current limit can increase when the integral decreases. Additionally, the integral of the output current can be calculated using an analog or digital circuit, as discussed herein. At step 608, the output current can be increased above the average current threshold as the dynamic current limit is increased or decreased. Eventually, and if needed to maintain a level of performance for the device performing method 600, the output current will reach a maximum current limit for the device. At step 610, the dynamic current limit can be set to the maximum current limit when the dynamic current limit reaches the maximum current limit.

Figure 7:
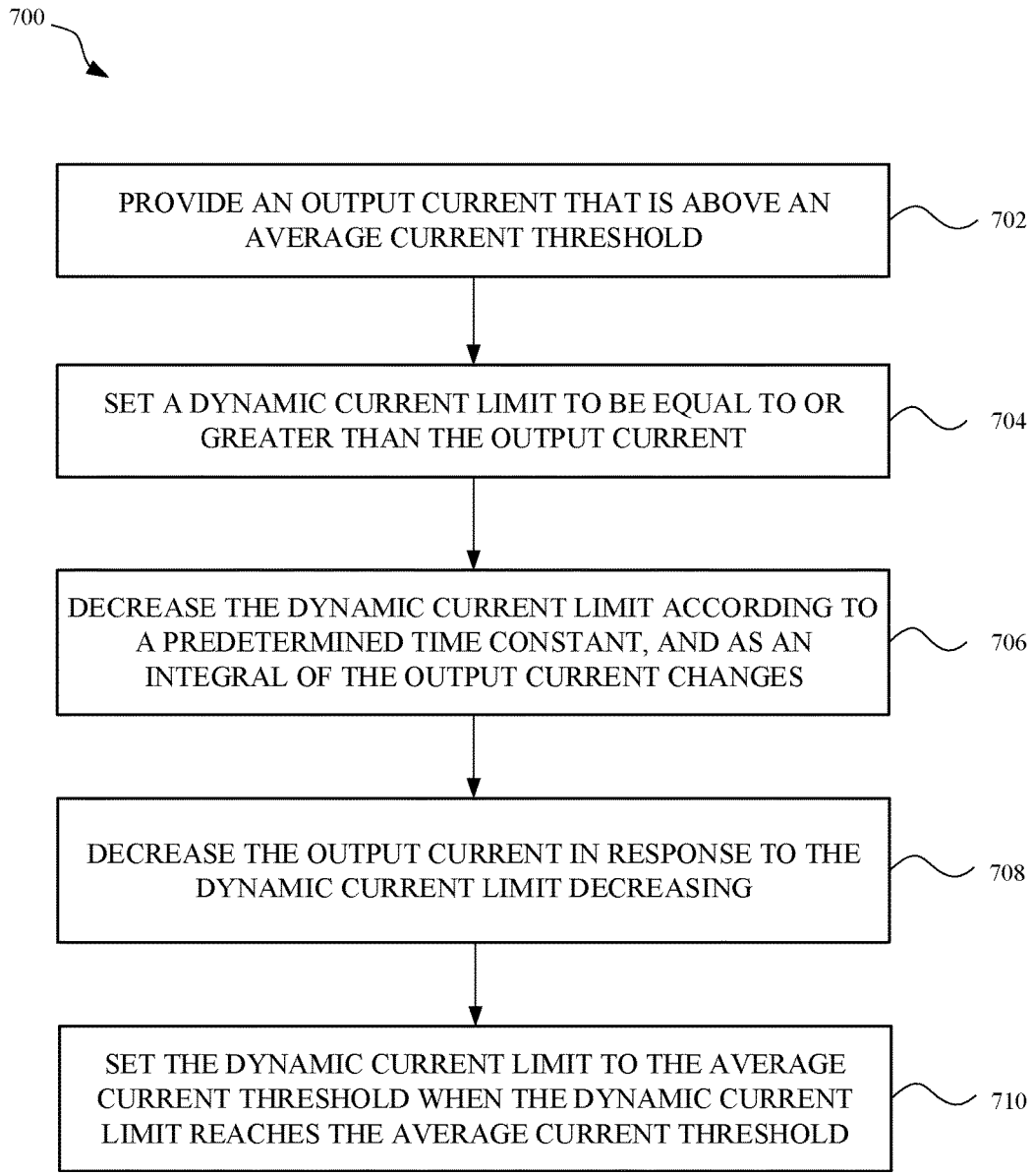
FIG. 7 illustrates a method for controlling a decrease of electrical current based on an average current threshold.

FIG. 7 illustrates a method 700 for controlling a decrease of electrical current based on an average current threshold. The method 700 can be performed by the power converter 108, computing device 102, a power management unit of the computing device 102, or any other suitable device, component, apparatus, processor capable of regulating current. It should be noted that method 700 can be performed before or after method 600. Furthermore, it should be noted that method 600 can be a continuation of method 700 and method 700 can be a continuation of method 600. The method can include a step 702 of setting an output current that is above an average current threshold. At step 704, a dynamic current limit is set equal to or greater than the output current. In this way, an amplitude of the output current will be limited to values that are equal to or less than the dynamic current limit. The dynamic current limit can be decreased, at step 706, according to a predetermined time constant and when an integral of the output current changes. For example, in some embodiments, the integral can be calculated based on a summation of a difference between a current threshold and the output current, and the dynamic current limit can decrease when the integral increases. The predetermined time constant of method 700 can be the same or a different time constant than the predetermined time constant of method 600. Additionally, the dynamic current limit can be decreased in order to maintain an average of the output current equal to or approximately equal to the average current threshold. At step 708, the output current can be decreased in response to the dynamic current limit decreasing. When the dynamic current limit reaches the average current threshold, at step 710, the dynamic current limit can be set equal to or below the average current threshold. In this way, the output current will be able to remain at or below the average current threshold without being limited by the dynamic current limit. However, if the output current starts to increase, method 600 can be performed in order to increase the dynamic current limit and the output current thereby allowing the output currents above the average current threshold to occur as need to improve performance of a device.

Figure 8:
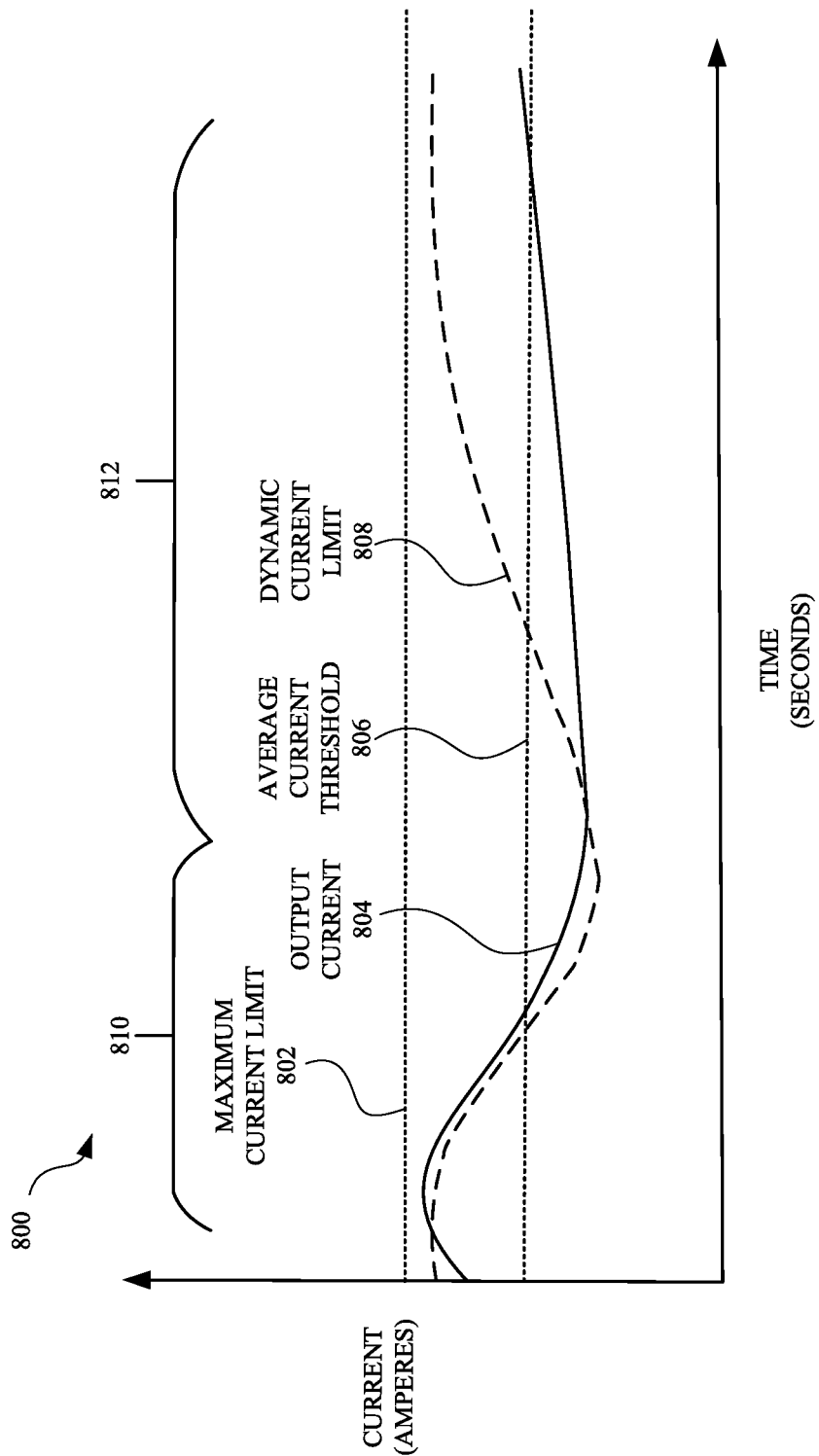
FIG. 8 illustrates a plot of an output current being controlled by a power converter according to some embodiments discussed herein.

FIG. 8 illustrates a plot 800 of an output current 804 being controlled by a power converter according to some embodiments discussed herein. Specifically, the plot 800 illustrates a dynamic current limit 808 associated with an integrator circuit of the power converter. The dynamic current limit 808 can scale with an integral of the output current 804. However, in some embodiments, the dynamic current limit 808 can scale according to a difference between the output current 804 and a current threshold, as discussed herein. As illustrated in plot 800, the output current 804 initially increases toward a maximum current limit 802 and eventually the output current 804 exceeds the dynamic current limit 808. In response to the output current 804 exceeding the dynamic current limit 808, the output current 804 will decrease at a rate based on a first time constant, as discussed herein. The output current 804 will decrease for a first period 810 until the output current 804 falls below the dynamic current limit 808. Once the output current 804 is below the dynamic current limit 808, the dynamic current limit 808 can begin to increase at rate that is based on a second time constant. At any point during operation of the power converter the output current 804 can be decreased if (i) the maximum current limit 802 is exceeded by the output current 804 (ii), the dynamic current limit 808 is exceeded by the output current 804, or a voltage component of the output current 804 falls below a minimum voltage threshold, as discussed herein. Decreasing and increasing the output current 804 in this way will enforce an average current threshold 806 at the power converter, which in turn can extend the lifetime of the power converter while improving performance a device being supplied the output current 804.

Figure 9:
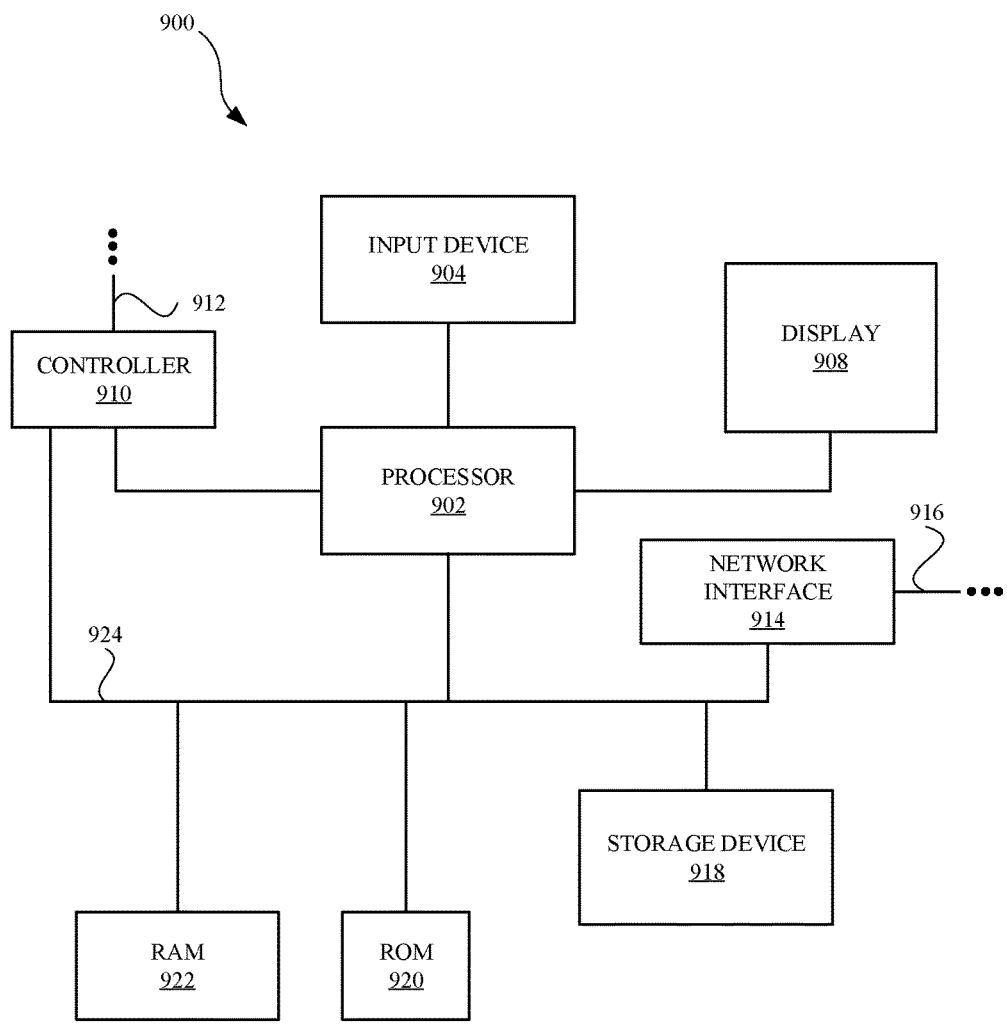
FIG. 9 is a block diagram of a computing device that can represent the components of the computing device or power converter discussed herein.

FIG. 9 is a block diagram of a computing device 900 that can represent the components of the computing device and/or power converter discussed herein. It will be appreciated that the components, devices or elements illustrated in and described with respect to FIG. 9 may not be mandatory and thus some may be omitted in certain embodiments. The computing device 900 can include a processor 902 that represents a microprocessor, a coprocessor, circuitry and/or a controller 910 for controlling the overall operation of computing device 900. Although illustrated as a single processor, it can be appreciated that the processor 902 can include a plurality of processors. The plurality of processors can be in operative communication with each other and can be collectively configured to perform one or more functionalities of the computing device 900 as described herein. In some embodiments, the processor 902 can be configured to execute instructions that can be stored at the computing device 900 and/or that can be otherwise accessible to the processor 902. As such, whether configured by hardware or by a combination of hardware and software, the processor 902 can be capable of performing operations and actions in accordance with embodiments described herein.

The computing device 900 can also include user input device 904 that allows a user of the computing device 900 to interact with the computing device 900. For example, user input device 904 can take a variety of forms, such as a button, keypad, dial, touch screen, audio input interface, visual/image capture input interface, input in the form of sensor data, etc. Still further, the computing device 900 can include a display 908 (screen display) that can be controlled by processor 902 to display information to a user. Controller 910 can be used to interface with and control different equipment through equipment control bus 912. The computing device 900 can also include a network/bus interface 914 that couples to data link 916. Data link 916 can allow the computing device 900 to couple to a host computer or to accessory devices. The data link 916 can be provided over a wired connection or a wireless connection. In the case of a wireless connection, network/bus interface 914 can include a wireless transceiver.

The computing device 900 can also include a storage device 918, which can have a single disk or a plurality of disks (e.g., hard drives) and a storage management module that manages one or more partitions (also referred to herein as "logical volumes") within the storage device 918. In some embodiments, the storage device 918 can include flash memory, semiconductor (solid state) memory or the like. Still further, the computing device 900 can include Read-Only Memory (ROM) 920 and Random Access Memory (RAM) 922. The ROM 920 can store programs, code, instructions, utilities or processes to be executed in a non-volatile manner. The RAM 922 can provide volatile data storage, and store instructions related to components of the storage management module that are configured to carry out the various techniques described herein. The computing device 900 can further include data bus 924. Data bus 924 can facilitate data and signal transfer between at least processor 902, controller 910, network/bus interface 914, storage device 918, ROM 920, and RAM 922.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A power converter, comprising:
    a logic component configured to:
        increase and decrease a dynamic output current limit of the power converter responsive to an integrated output current signal of the power converter, and
        cause the power converter to throttle an output current of the power converter to remain below the dynamic output current limit.

2. The power converter of claim 1, wherein the logic component is further configured hold the dynamic output current limit at a maximum current limit until an average current output of the power converter reaches or exceeds a predetermined average current output.

3. The power converter of claim 2, wherein adjusting the dynamic output current limit includes decreasing the output current limit when the average current output of the power converter exceeds the predetermined average current output.

4. The power converter of claim 1, wherein the integrated output current signal is a sum of multiple previous current output signals of the power converter.

5. The power converter of claim 4, wherein each of the multiple previous current output signals is generated based on a difference between the output current of the power converter and a maximum current limit.

6. The power converter of claim 1, wherein the logic component is further configured to decrease the dynamic output current limit of the power converter according to a first time constant and increase the output current limit of the power converter according to a second time constant that is different than the first time constant.

7. The power converter of claim 1, wherein the power converter is configured as a direct current (DC) to DC converter.

8. The power converter of claim 1, wherein the logic component is further configured to throttle the output current of the power converter when a supply voltage of the power converter reaches a minimum voltage threshold.

9. A method for adjusting a dynamic current limit for a power converter to maintain an average current output for the power converter, the method comprising:
    by the power converter:
        increasing and decreasing a dynamic output current limit of the power converter responsive to an integrated output current for the power converter as compared to a predetermined average current threshold; and
        throttling an output current of the power converter to remain below the adjusted dynamic output current limit.

10. The method of claim 9, wherein adjusting the dynamic output current limit of the power converter comprises decreasing the dynamic current limit of the power converter when the average output current of the power converter exceeds a predetermined average current output.

11. The method of claim 9, further comprising:
    maintaining the dynamically adjusted dynamic output current limit at a maximum current threshold until the integrated output current reaches the predetermined average current threshold.

12. The method of claim 9, further comprising:
    when a voltage output of the power converter reaches a minimum voltage threshold, throttling the voltage output.

13. The method of claim 9, wherein:
    integrating the output current and adjusting the dynamic output current limit of the power converter are performed simultaneously.

14. A computing device, comprising:
    a power source; and
    a power converter connected to the power source, the power converter comprising one or more switches that are configured to toggle between switching states to vary an output current of the power converter, wherein a period between the switching states is dynamically adjusted to throttle an output current of the power converter to remain below a dynamic output current limit that is increased and decreased responsive to an integrated output current of the power converter.

15. The computing device of claim 14, wherein each of the one or more switches is connected to an inductor, and an output of the inductor is connected to a feedback loop of the power converter.

16. The computing device of claim 14, wherein the power converter is configured to dynamically adjust the period between switching states when a voltage output of the power converter reaches a minimum voltage threshold.

17. The computing device of claim 14, wherein the power converter is configured to dynamically adjust the period between switching states when the output current of the power converter reaches or exceeds a maximum current threshold.

18. The computing device of claim 14, wherein the power converter is configured to increase the dynamic output current limit of the power converter when an average output current of the power converter falls below an average output current threshold.

* * * * *